(12) United States Patent
Vendetti et al.

(10) Patent No.: US 10,098,212 B2
(45) Date of Patent: Oct. 9, 2018

(54) SYSTEMS AND METHODS FOR CONTROLLING OUTDOOR LUMINAIRE WIRELESS NETWORK USING SMART APPLIANCE

(71) Applicant: Express Imaging Systems, LLC, Seattle, WA (US)

(72) Inventors: Donald Arthur Vendetti, Seattle, WA (US); William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 0 days.

(21) Appl. No.: 15/895,439

(22) Filed: Feb. 13, 2018

(65) Prior Publication Data

US 2018/0235060 A1    Aug. 16, 2018

Related U.S. Application Data

(60) Provisional application No. 62/458,970, filed on Feb. 14, 2017.

(51) Int. Cl.
*H05B 37/02* (2006.01)
*H04W 4/80* (2018.01)
(Continued)

(52) U.S. Cl.
CPC .... *H05B 37/0272* (2013.01); *H04W 36/0072* (2013.01); *H04W 72/0446* (2013.01);
(Continued)

(58) Field of Classification Search
CPC ............ H05B 37/0272; H05B 37/0227; H05B 37/0218; H05B 33/0854; H05B 37/0245;
(Continued)

(56) References Cited

U.S. PATENT DOCUMENTS 2,745,055 A    5/1956    Woerdemann
4,153,927 A    5/1979    Owens
(Continued)

FOREIGN PATENT DOCUMENTS

CN    103162187 A    6/2013
DE    40 01 980 A1    8/1990
(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.
(Continued)

*Primary Examiner* — Vibol Tan
(74) *Attorney, Agent, or Firm* — Cozen O'Connor

(57) ABSTRACT

Systems and methods which utilize luminaires that include wireless communication capabilities that allow the luminaires to be controlled by a wireless-enabled mobile system disposed proximate the luminaires. Control of a network of wireless-enabled luminaires is provided via a single mobile system utilizing wireless communication through at least one gateway luminaire without requiring connection between the luminaires and a central management system (CMS). Information sent to or collected from the luminaires through the mobile system may be transferred via a mobile network interface from or to a CMS. The luminaires may use their wireless communication ability to obtain data from nearby wireless sensors, which data may be collected by the mobile system from luminaires in the network of luminaires when the mobile system is positioned proximate at least one of the luminaires. The sensor data and/or other data may be uploaded to the central management system in a non-real-time period.

32 Claims, 7 Drawing Sheets

(51) Int. Cl.
*H04W 72/04* (2009.01)
*H05B 33/08* (2006.01)
*H04W 84/18* (2009.01)
*H04W 36/00* (2009.01)
*H04W 64/00* (2009.01)
*H04W 8/00* (2009.01)

(52) U.S. Cl.
CPC ....... *H04W 72/0493* (2013.01); *H04W 84/18* (2013.01); *H05B 33/0845* (2013.01); *H05B 37/0218* (2013.01); *G08C 2201/93* (2013.01); *H04W 4/80* (2018.02); *H04W 8/005* (2013.01); *H04W 64/003* (2013.01)

(58) Field of Classification Search
CPC .......................... H05B 33/0842; H05B 37/02; H05B 33/0872; H05B 37/0236; H05B 39/041; H04W 4/80; H04W 84/12; H04W 88/06; H04W 88/16; H04W 4/005; H04W 64/003; H04B 1/38; Y02B 20/46; Y02B 20/72; Y02B 20/445; Y02B 20/48; G08C 2201/93
See application file for complete search history.

(56) References Cited

U.S. PATENT DOCUMENTS

| | | | |
|---|---|---|---|
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,838,226 A | 11/1998 | Houggy et al. | |
| 5,936,362 A | 8/1999 | Alt et al. | |
| 6,111,739 A | 8/2000 | Wu et al. | |
| 6,160,353 A | 12/2000 | Mancuso | |
| 6,377,191 B1 | 4/2002 | Takubo | |
| 6,612,720 B1 | 9/2003 | Beadle | |
| 6,674,060 B2 | 1/2004 | Antila | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,880,956 B2 | 4/2005 | Zhang | |
| 6,902,292 B2 | 6/2005 | Lai | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,196,477 B2 | 3/2007 | Richmond | |
| 7,218,056 B1 | 5/2007 | Harwood | |
| 7,239,087 B2 | 7/2007 | Ball | |
| 7,252,385 B2 | 8/2007 | Engle et al. | |
| 7,258,464 B2 | 8/2007 | Morris et al. | |
| 7,281,820 B2 | 10/2007 | Bayat et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,623,042 B2 | 11/2009 | Huizenga | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,665,862 B2 | 2/2010 | Villard | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,697,925 B1 | 4/2010 | Wilson et al. | |
| 7,703,951 B2 | 4/2010 | Piepgras et al. | |
| 7,798,669 B2 | 9/2010 | Trojanowski et al. | |
| 7,804,200 B2 | 9/2010 | Flaherty | |
| 7,828,463 B1 | 11/2010 | Willis | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,183,797 B2 | 5/2012 | McKinney | |
| 8,207,830 B2 | 6/2012 | Rutjes et al. | |
| 8,260,575 B2 | 9/2012 | Walters et al. | |
| 8,290,710 B2 | 10/2012 | Cleland et al. | |
| 8,324,840 B2 | 12/2012 | Shteynberg et al. | |
| 8,334,640 B2 | 12/2012 | Reed et al. | |
| 8,378,563 B2 | 2/2013 | Reed et al. | |
| 8,390,475 B2 | 3/2013 | Feroldi | |
| 8,427,076 B2 | 4/2013 | Bourquin et al. | |
| 8,436,556 B2 | 5/2013 | Eisele et al. | |
| 8,450,670 B2 | 5/2013 | Verfuerth et al. | |
| 8,457,793 B2 | 6/2013 | Golding et al. | |
| 8,508,137 B2 | 8/2013 | Reed | |
| 8,541,950 B2 | 9/2013 | Reed | |
| 8,547,022 B2 | 10/2013 | Summerford et al. | |
| 8,610,358 B2 | 12/2013 | Reed | |
| 8,629,621 B2 | 1/2014 | Reed | |
| 8,674,608 B2 | 3/2014 | Holland et al. | |
| 8,749,403 B2 | 6/2014 | King et al. | |
| 8,810,138 B2 | 8/2014 | Reed | |
| 8,872,964 B2 | 10/2014 | Reed et al. | |
| 8,878,440 B2 | 11/2014 | Reed | |
| 8,896,215 B2 | 11/2014 | Reed et al. | |
| 8,901,825 B2 | 12/2014 | Reed | |
| 8,922,124 B2 | 12/2014 | Reed et al. | |
| 8,926,138 B2 | 1/2015 | Reed et al. | |
| 8,926,139 B2 | 1/2015 | Reed et al. | |
| 8,975,827 B2 | 3/2015 | Chobot et al. | |
| 8,987,992 B2 | 3/2015 | Reed | |
| 8,988,005 B2 | 3/2015 | Jungwirth et al. | |
| 9,002,522 B2 | 4/2015 | Mohan et al. | |
| 9,024,545 B2 | 5/2015 | Bloch et al. | |
| 9,054,961 B1* | 6/2015 | Kim .................. | H04L 41/0806 |
| 9,107,026 B1 | 8/2015 | Viswanadham et al. | |
| 9,119,270 B2 | 8/2015 | Chen et al. | |
| 9,204,523 B2 | 12/2015 | Reed et al. | |
| 9,210,751 B2 | 12/2015 | Reed | |
| 9,210,759 B2 | 12/2015 | Reed | |
| 9,288,873 B2 | 3/2016 | Reed | |
| 9,312,451 B2 | 4/2016 | Reed et al. | |
| 9,357,618 B2 | 5/2016 | Pandharipande et al. | |
| 9,398,588 B2* | 7/2016 | Wang ................. | H05B 37/0272 |
| 9,408,280 B2* | 8/2016 | Schroder ............ | H05B 37/0272 |
| 9,414,449 B2 | 8/2016 | Reed | |
| 9,451,462 B2* | 9/2016 | Kim .................... | H04L 63/0876 |
| 9,466,443 B2 | 10/2016 | Reed | |
| 9,572,230 B2 | 2/2017 | Reed | |
| 9,693,433 B2 | 6/2017 | Reed et al. | |
| 9,713,228 B2 | 7/2017 | Reed | |
| 9,769,903 B2* | 9/2017 | Hu ..................... | H05B 37/0272 |
| 9,801,248 B2 | 10/2017 | Reed et al. | |

(56) References Cited

U.S. PATENT DOCUMENTS

| | | | |
|---|---|---|---|
| 9,814,084 B2 * | 11/2017 | Sidhu | H04W 76/11 |
| 9,860,965 B2 * | 1/2018 | Recker | H05B 37/0272 |
| 9,882,639 B2 * | 1/2018 | Ryan | H04B 10/116 |
| 9,918,351 B2 * | 3/2018 | Kim | H04L 63/0876 |
| 9,961,750 B2 * | 5/2018 | Leinen | H05B 37/0218 |
| 2003/0016143 A1 | 1/2003 | Ghazarian | |
| 2003/0184672 A1 | 10/2003 | Wu et al. | |
| 2004/0192227 A1 | 9/2004 | Beach et al. | |
| 2006/0014118 A1 | 1/2006 | Utama | |
| 2006/0066264 A1 | 3/2006 | Ishigaki et al. | |
| 2006/0146652 A1 | 7/2006 | Huizi et al. | |
| 2007/0032990 A1 | 2/2007 | Williams et al. | |
| 2007/0102033 A1 | 5/2007 | Petrocy | |
| 2007/0225933 A1 | 9/2007 | Shimomura | |
| 2008/0018261 A1 | 1/2008 | Kastner | |
| 2008/0025020 A1 | 1/2008 | Kolb | |
| 2008/0043106 A1 | 2/2008 | Hassapis et al. | |
| 2008/0130304 A1 | 6/2008 | Rash et al. | |
| 2008/0266839 A1 | 10/2008 | Claypool et al. | |
| 2009/0046151 A1 | 2/2009 | Nagaoka et al. | |
| 2009/0058320 A1 | 3/2009 | Chou et al. | |
| 2009/0153062 A1 | 6/2009 | Guo et al. | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0195162 A1 | 8/2009 | Maurer et al. | |
| 2009/0195179 A1 | 8/2009 | Joseph et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0278479 A1 | 11/2009 | Platner et al. | |
| 2010/0001652 A1 | 1/2010 | Damsleth | |
| 2010/0052557 A1 | 3/2010 | Van Der Veen et al. | |
| 2010/0123403 A1 | 5/2010 | Reed | |
| 2010/0171442 A1 | 7/2010 | Draper et al. | |
| 2010/0237711 A1 | 9/2010 | Parsons | |
| 2010/0244708 A1 | 9/2010 | Cheung et al. | |
| 2010/0246168 A1 | 9/2010 | Verfuerth et al. | |
| 2010/0259193 A1 | 10/2010 | Umezawa et al. | |
| 2010/0271802 A1 | 10/2010 | Recker et al. | |
| 2010/0309310 A1 | 12/2010 | Albright | |
| 2010/0328946 A1 | 12/2010 | Borkar et al. | |
| 2011/0001626 A1 | 1/2011 | Yip et al. | |
| 2011/0006703 A1 | 1/2011 | Wu et al. | |
| 2011/0026264 A1 | 2/2011 | Reed et al. | |
| 2011/0215724 A1 | 9/2011 | Chakravarty et al. | |
| 2011/0221346 A1 | 9/2011 | Lee et al. | |
| 2011/0251751 A1 | 10/2011 | Knight | |
| 2011/0282468 A1 | 11/2011 | Ashdown | |
| 2011/0310605 A1 | 12/2011 | Renn et al. | |
| 2012/0001566 A1 | 1/2012 | Josefowicz et al. | |
| 2012/0019971 A1 | 1/2012 | Flaherty et al. | |
| 2012/0038490 A1 | 2/2012 | Verfuerth | |
| 2012/0098439 A1 | 4/2012 | Recker et al. | |
| 2012/0146518 A1 | 6/2012 | Setomoto et al. | |
| 2012/0169053 A1 | 7/2012 | Tchoryk, Jr. et al. | |
| 2012/0169239 A1 | 7/2012 | Chen et al. | |
| 2012/0181935 A1 | 7/2012 | Velazquez | |
| 2012/0194054 A1 | 8/2012 | Johnston et al. | |
| 2012/0221154 A1 | 8/2012 | Runge | |
| 2012/0242254 A1 | 9/2012 | Kim et al. | |
| 2012/0286770 A1 | 11/2012 | Schröder et al. | |
| 2013/0057158 A1 | 3/2013 | Josefowicz et al. | |
| 2013/0126715 A1 | 5/2013 | Flaherty | |
| 2013/0141000 A1 | 6/2013 | Wei et al. | |
| 2013/0163243 A1 | 6/2013 | Reed | |
| 2013/0229518 A1 | 9/2013 | Reed et al. | |
| 2013/0235202 A1 | 9/2013 | Nagaoka et al. | |
| 2013/0249429 A1 | 9/2013 | Woytowitz et al. | |
| 2013/0340353 A1 | 12/2013 | Whiting et al. | |
| 2014/0001961 A1 | 1/2014 | Anderson et al. | |
| 2014/0028198 A1 | 1/2014 | Reed et al. | |
| 2014/0028200 A1 | 1/2014 | Van Wagoner et al. | |
| 2014/0055990 A1 | 2/2014 | Reed | |
| 2014/0159585 A1 | 6/2014 | Reed | |
| 2014/0166447 A1 | 6/2014 | Thea et al. | |
| 2014/0244044 A1 | 8/2014 | Davis et al. | |
| 2014/0359078 A1 | 12/2014 | Liu | |
| 2015/0015716 A1 | 1/2015 | Reed et al. | |
| 2015/0069920 A1 | 3/2015 | Denteneer et al. | |
| 2015/0123563 A1 | 5/2015 | Dahlen | |
| 2016/0150622 A1 | 5/2016 | Flinsenberg et al. | |
| 2016/0234899 A1 | 8/2016 | Reed et al. | |

FOREIGN PATENT DOCUMENTS

| | | |
|---|---|---|
| EP | 1 734 795 A1 | 12/2006 |
| EP | 2 320 713 A2 | 5/2011 |
| EP | 2 559 937 A1 | 2/2013 |
| EP | 2 629 491 A1 | 8/2013 |
| EP | 1 459 600 B1 | 2/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 10-2005-0078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010-086757 A1 | 8/2010 |
| WO | 2010/133719 A1 | 11/2010 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Corrected Notice of Allowance, dated Aug. 12, 2015, and Notice of Allowance, dated Jul. 31, 2015 for Reed et al., "Remotely Adjustable Solid-State Lamp," U.S. Appl. No. 13/875,130, 11 pages.

EE Herald, "Devices to protect High brightness LED from ESD," dated Mar. 16, 2009, retrieved Jun. 10, 2011, from http://www.eeherald.com/section/new-products/np100779.html, 1 page.

European Office Action, dated Aug. 11, 2017, for European Application No. 13 823 055.2-1802, 4 pages.

Extended European Search Report dated Aug. 25, 2016, for corresponding EP Application No. 14843796.5-1757, 6 pages.

Extended European Search Report dated Jan. 4, 2016, for corresponding EP Application No. 13823055.2-1802, 7 pages.

Extended European Search Report dated Oct. 21, 2015, for corresponding EP Application No. 13835001.2-1802, 7 pages.

(56) References Cited

OTHER PUBLICATIONS

Extended European Search Report, dated Aug. 13, 2014, for corresponding European Application No. 09826926.9, 8 pages.
Extended European Search Report, dated May 3, 2016, for corresponding European Application No. 12771286.7, 9 pages.
Extended European Search Report, dated Sep. 28, 2015, for corresponding European Application No. 12850159.0-1802, 6 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report and Written Opinion, dated Feb. 29, 2016, for PCT/US2015/053000, 20 pages.
International Search Report and Written Opinion, dated Feb. 29, 2016, for PCT/US2015/053006, 21 pages.
International Search Report and Written Opinion, dated Jan. 13, 2016. for PCT/US2015/053009, 15 pages.
International Search Report dated Nov. 11, 2014, for International Application No. PCT/US2014/047867, 3 pages.
International Search Report, dated Dec. 13, 2010 for PCT/US2010/035649, 3 pages.
International Search Report, dated Dec. 15, 2010 for PCT/US2010/035658, 3 pages.
International Search Report, dated Dec. 28, 2010 for PCT/US2010/035651, 3 pages.
International Search Report, dated Dec. 30, 2013 for PCT/US2013/058266, 3 pages.
International Search Report, dated Feb. 26, 2014, for PCT/US2013/070794, 3 pages.
International Search Report, dated Feb. 27, 2013, for PCT/US2012/065476, 3 pages.
International Search Report, dated Jan. 14, 2013, for PCT/US2012/052009, 3 pages.
International Search Report, dated Jul. 9, 2009 for PCT/US2009/043171, 5 pages.
International Search Report, dated Jun. 21, 2010, for PCT/US2009/064625, 3 pages.
International Search Report, dated Nov. 19, 2013 for PCT/US2013/052092, 4 pages.
International Search Report, dated Oct. 8, 2012 for PCT/US2012/033059, 3 pages.
International Search Report, dated Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Notice of Allowance dated Apr. 11, 2014, for Reed, "Apparatus and Method of Energy Efficient Illumination," U.S. Appl. No. 13/943,537, 9 pages.
Notice of Allowance dated Apr. 12, 2013, for Reed, "Apparatus and Method of Energy Efficient Illumination," U.S. Appl. No. 12/784,093, 9 pages.
Notice of Allowance dated Apr. 27, 2015, for Reed et al., "Apparatus and Method of Operating a Luminaire," U.S. Appl. No. 13/558,191, 8 pages.
Notice of Allowance dated Aug. 29, 2014, for Reed et al., "Adjustable Output Solid-State Lamp With Security Features," U.S. Appl. No. 13/679,687, 9 pages.
Notice of Allowance dated Jul. 1, 2014, for Reed, "Luminaire With Atmospheric Electrical Activity Detection and Visual Alert Capabilities," U.S. Appl. No. 13/786,114, 9 pages.
Notice of Allowance dated Jul. 30, 2014, for Reed, "Apparatus and Method of Energy Efficient Illumination Using Received Signals," U.S. Appl. No. 13/085,301, 5 pages.
Nofice of Allowance dated Jul. 7, 2014, for Reed et al., "Apparatus and Method for lies Schedule Based Operation of a Luminaire," U.S. Appl. No. 13/604,327, 8 pages.
Notice of Allowance dated Jun. 19, 2015, for Reed et al., "Apparatus and Method for Schedule Based Operation of a Luminaire" U.S. Appl. No. 14/552,274, 9 pages.
Notice of Allowance dated Jun. 20, 2014, for Reed et al., "Long-Range Motion Detection for Illumination Control," U.S. Appl. No. 12/784,080, 7 pages.
Notice of Allowance dated Mar. 16, 2017, for U.S. Appl. No. 14/552,274, Reed et al., "Apparatus and Method for Schedule Based Operation of a Luminaire," 9 pages.
Notice of Allowance dated Mar. 24, 2017, for Reed, "Apparatus and Method of Energy Efficient Illumination Using Received Signals," U.S. Appl. No. 14/557,275, 23 pages.
Notice of Allowance dated May 23, 2013, for Reed, "Apparatus and Method of Energy Efficient Illumination," U.S. Appl. No. 12/784,091, 6 pages.
Notice of Allowance dated Nov. 5, 2014, for Reed, "Apparatus and Method of Energy Efficient Illumination," U.S. Appl. No. 14/329,508, 10 pages.
Notice of Allowance dated Oct. 5, 2016 for U.S. Appl. No. 14/869,511, Reed, "Centralized Control of Area Lighting Hours of Illumination," 8 pages.
Notice of Allowance dated Sep. 12, 2013, for Reed, "Electrostatic Discharge Protection for Luminaire," U.S. Appl. No. 13/212,074, 6 pages.
Notice of Allowance dated Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire ," 11 pages.
Office Action dated Apr. 21, 2015, for Reed et al., "Remotely Adjustable Solid-State Lamp," U.S. Appl. No. 13/875,130, 10 pages.
Office Action dated Apr. 23, 2014, for Reed, "Apparatus and Method of Energy Efficient Illumination Using Received Signals," U.S. Appl. No. 13/085,301, 12 pages.
Office Action dated Apr. 24, 2013, for Reed, "Apparatus and Method of Energy Efficient Illumination," U.S. Appl. No. 12/784,091, 12 pages.
Office Action dated Aug. 23, 2016, for Reed, "Apparatus and Method of Energy Efficient Illumination Using Received Signals," U.S. Appl. No. 14/557,275, 23 pages.
Office Action dated Aug. 28, 2014, for Reed, "Apparatus and Method of Energy Efficient Illumination," U.S. Appl. No. 14/329,508, 8 pages.
Office Action dated Aug. 31, 2016, for U.S. Appl. No. 14/869,501,Reed, "Asset Management System for Outdoor Luminaires," 15 pages.
Office Action dated Dec. 17, 2014, for Reed, "Luminaire With Ambient Sensing and Autonomous Control Capabilities," U.S. Appl. No. 13/786,332, 20 pages.
Office Action dated Dec. 21, 2012, for Reed et al., "Long-Range Motion Detection for Illumination Control," U.S. Appl. No. 12/784,080, 26 pages.
Office Action dated Dec. 22, 2014, for Reed et al., "Apparatus and Method of Operating a Luminaire," U.S. Appl. No. 13/558,191, 17 pages.
Office Action dated Dec. 5, 2012, for Reed, "Apparatus and Method of Energy Efficient Illumination," U.S. Appl. No. 12/784,091, 18 pages.

(56) References Cited

OTHER PUBLICATIONS

Office Action dated Dec. 5, 2012, for Reed, "Apparatus and Method of Energy Efficient Illumination," U.S. Appl. No. 12/784,093, 13 pages.
Office Action dated Feb. 17, 2017, for U.S. Appl. No. 14/939,856, Reed et al., "Luminaire With Adjustable Illumination Pattern," 13 pages.
Office Action dated Feb. 27, 2014, for Reed et al., "Adjustable Output Solid-State Lamp With Security Features," U.S. Appl. No. 13/679,687, 11 pages.
Office Action dated Jan. 30, 2014, for Reed et al., "Long-Range Motion Detection for Illumination Control," U.S. Appl. No. 12/784,080, 26 pages.
Office Action dated Jul. 22, 2013, for Reed et al., "Long-Range Motion Detection for Illumination Control," U.S. Appl. No. 12/784,080, 29 pages.
Office Action dated Mar. 15, 2013 for Reed et al., "Electrostatic Discharge Protection for Luminaire," U.S. Appl. No. 13/212,074, 11 pages.
Office Action dated Mar. 2, 2015, for Reed et al., "Apparatus and Method for Schedule Based Operations of a Luminaire," U.S. Appl. No. 14/552,274, 7 pages.
Office Action dated Mar. 26, 2014, for Reed et al., "Apparatus and Method for Schedule Based Operation of a Luminaire," U.S. Appl. No. 13/604,327, 10 pages.
Office Action dated Nov. 27, 2013, for Reed, "Apparatus and Method of Energy Efficient Illumination," U.S. Appl. No. 13/943,537, 8 pages.
Office Action dated Oct. 1, 2013, for Reed, "Apparatus and Method of Energy Efficient Illumination Using Received Signals," U.S. Appl. No. 13/085,301, 11 pages.
Office Action dated Sep. 19, 2016, for U.S. Appl. No. 14/552,274, Reed et al., "Apparatus and Method for Schedule Based Operation of a Luminaire," 9 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method of Operating a Luminaire," Amendment filed Mar. 19, 2015, for U.S. Appl. No. 13/558,191, 20 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," U.S. Appl. No. 61/641,781, filed May 2, 2012, 65 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 61/333,983, filed May 12, 2010, 57 pages.
Reed, "Asset Management System for Outdoor Luminaires," U.S. Appl. No. 14/869,501, filed Sep. 29, 2015, 57 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Centralized Control of Area Lighting Hours of Illumination," Office Action dated Mar. 24, 2016 for U.S. Appl. No. 14/869,511, 31 pages.
Reed, "Detection and Correction of Faulty Photo Controls in Outdoor Luminaires," Notice of Allowance dated May 19, 2016 for U.S. Appl. No. 14/869,492, 9 pages.
Reed, "Detection and Correction of Faulty Photo Controls in Outdoor Luminaires," U.S. Appl. No. 14/869,492, filed Sep. 29, 2015, 71 pages.
Reed, "Detection and Correction of Faulty Photo Controls in Outdoor Luminaires," U.S. Appl. No. 62/068,517, filed Oct. 24, 2014, 47 pages.

(56) References Cited

OTHER PUBLICATIONS

Reed, "Detection and Correction of Faulty Photo Controls in Outdoor Luminaires," U.S. Appl. No. 62/183,505, filed Jun. 23, 2015, 71 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," Amendment filed Jul. 23, 2015, for U.S. Appl. No. 13/786,332, 17 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Notice of Allowance dated Aug. 6, 2015, for U.S. Appl. No. 13/786,332, 8 pages.
Reed, "Luminaire With Ambient Sensing and Autonomous Control Capabilities," Notice of Allowance dated May 4, 2016, for U.S. Appl. No. 14/950,823, 10 pages.
Reed, "Luminaire With Ambient Sensing and Autonomous Control Capabilities," Office Action dated May 29, 2015, for U.S. Appl. No. 13/786,332, 7 pages.
Reed, "Luminaire With Ambient Sensing and Autonomous Control Capabilities," U.S. Appl. No. 14/950,823, filed Nov. 24, 2015, 72 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Luminaire With Adjustable Illumination Pattern," U.S. Appl. No. 62/114,826, filed Feb. 11, 2015, 68 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Vendetti et al., "Systems and Methods for Outdoor Luminaire Wireless Control," U.S. Appl. No. 15/943,183, filed Apr. 2, 2018, 40 pages.
Vendetti et al., "Systems and Methods for Outdoor Luminaire Wireless Control," U.S. Appl. No. 62/480,833, filed Apr. 3, 2017, 40 pages.
Written Opinion dated Nov. 11, 2014, for International Application No. PCT/US2014/047867, 5 pages.
Written Opinion, dated Dec. 13, 2010 for PCT/US2010/035649, 4 pages.
Written Opinion, dated Dec. 15, 2010 for PCT/US2010/035658, 3 pages.
Written Opinion, dated Dec. 28, 2010 for PCT/US2010/035651, 3 pages.
Written Opinion, dated Dec. 30, 2013 for PCT/US2013/058266, 8 pages.
Written Opinion, dated Feb. 26, 2014, for PCT/US2013/070794, 10 pages.
Written Opinion, dated Feb. 27, 2013, for PCT/US2012/065476, 8 pages.
Written Opinion, dated Jan. 14, 2013, for PCT/US2012/052009, 5 pages.
Written Opinion, dated Jul. 9, 2009 for PCT/US2009/043171, 8 pages.
Written Opinion, dated Jun. 21, 2010 for PCT/US2009/064625, 5 pages.
Written Opinion, dated Nov. 19, 2013 for PCT/US2013/052092, 7 pages.
Written Opinion, dated Oct. 8, 2012 for PCT/US2012/033059, 3 pages.
Written Opinion, dated Sep. 30, 2011, for PCT/US2011/021359, 4 pages.

* cited by examiner

SYSTEMS AND METHODS FOR CONTROLLING OUTDOOR LUMINAIRE WIRELESS NETWORK USING SMART APPLIANCE

BACKGROUND

Technical Field

The present disclosure relates to illumination, and more particularly to management of a plurality of illumination devices and systems.

Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

To simplify power distribution and control wiring, such luminaires may be organized into groups or similar hierarchical power and control structures. For example, multiple luminaires along a roadway may be grouped together on a common power circuit that is controlled using a single, centralized controller to collectively adjust the luminous output of all of the luminaires in the group. In another instance, multiple luminaires within a parking garage may be controlled using a single photocell mounted on the exterior of the parking garage. Such installations may however compromise operational flexibility for ease of installation and simplicity of operation.

Energy conservation has become of ever-increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

There appear to be at least two primary approaches to reducing energy consumption associated with lighting systems. One approach employs higher efficiency light sources. The other approach selectively provides light only when needed.

Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, fluorescent light sources may take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminated with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism. Automatic control mechanisms generally fall into two broad categories, timers and environmental sensors. Timer based control mechanisms turn light sources ON and OFF based on time. The times are typically user configurable. Such relies on the user to account for changes or variations in the length of daylight in a 24 hour cycle which may occur throughout a year. Very often, timer based control mechanisms are set once and never updated.

Environmental sensor based control mechanisms sense light or illumination levels and/or motion or proximity. Light or illumination level based control mechanisms are commonly referred to as dusk-to-dawn sensors. Dusk-to-dawn light or illumination level based control mechanisms turn the light sources ON when a level of light or illumination in an environment falls below a turn ON threshold (i.e., dusk threshold), and turn the light sources OFF when the level of light or illumination exceeds a turn OFF threshold (i.e., dawn threshold). Light or illumination level based control subsystems advantageously automatically accommodate changes in length of day light throughout the year.

Example outdoor lighting systems may include a number of individual luminaires mounted on poles and that are each controlled by a photocontrol (or other mechanism) that controls the AC power to the luminaire for daytime and nighttime operation. There are also scenarios where groups of luminaires are controlled together by an AC contactor that activates power to the group as a whole, and controlled by a photocontrol, timer, etc.

More elaborate lighting networks may cover a large area, such as a city, and may include numerous individual luminaires outfitted with network communication nodes that can each be controlled by a remotely located central management system (CMS). Communication between the luminaires and the CMS may be enabled through mesh or mobile wireless networks, or through powerline communications. The network nodes may additionally offer more capabilities to control the luminaires, such as dimming to specific levels and varying illumination with time, metering of the power being consumed by the luminaire, maintenance alerts regarding luminaire failure or malfunction, and ability to commission and/or decommission the luminaires remotely. However, the cost and complexity to deploy such lighting networks and to integrate them with a CMS is often very high.

BRIEF SUMMARY

An illumination system may be summarized as including: a plurality of terminal luminaires, each of the terminal luminaires including: at least one terminal luminaire processor; at least one light source operatively coupled to the at least one terminal luminaire processor; a terminal luminaire transceiver operatively coupled to the at least one terminal luminaire processor, in operation the terminal luminaire transceiver communicates via a first communications protocol; and at least one nontransitory processor-readable storage medium operatively coupled to the at least one terminal luminaire processor and storing at least one of data or instructions; a gateway luminaire including: at least one gateway luminaire processor; at least one light source operatively coupled to the at least one gateway luminaire processor; a first gateway luminaire transceiver operatively coupled to the at least one gateway luminaire processor, in operation the first gateway luminaire transceiver communicates via the first communications protocol; a second gateway luminaire transceiver operatively coupled to the at least one gateway luminaire processor, in operation the second gateway luminaire transceiver communicates via a second communications protocol, the second communications protocol different from the first communications protocol; and at least one nontransitory processor-readable storage medium operatively coupled to the at least one gateway luminaire processor and storing at least one of data or instructions which, when executed by the at least one gateway luminaire processor, cause the at least one gateway luminaire processor to: receive, via the second gateway luminaire transceiver, at least one of instructions or data from at least one mobile system; and send, via the first gateway luminaire transceiver, the received at least one of instructions or data to at least one of the plurality of terminal luminaires.

At least some of the plurality of terminal luminaires may communicate with other of the plurality of terminal luminaires using the first communications protocol via respective terminal luminaire transceivers. Each of the plurality of terminal luminaires may communicate with at least one gateway luminaire using the first communications protocol via respective terminal luminaire transceivers. The first and second communication protocols may be wireless communications protocols, the first and second communications protocols may have first and second ranges, respectively, and the first range may be greater than the second range. The at least one gateway luminaire processor: may receive, via the second gateway luminaire transceiver, at least one of commissioning data, decommissioning data, dimming level data, light schedule data, firmware update data or operational parameter data from the at least one mobile system. The at least one gateway luminaire processor: may receive, via the first gateway luminaire transceiver, at least one of instructions or data from at least one of the plurality of terminal luminaires; and may send, via the second gateway luminaire transceiver, the received at least one of instructions or data to the at least one mobile system. The illumination system may further include: a mobile system including: at least one mobile system processor; a first mobile system transceiver operatively coupled to the at least one mobile system processor, in operation the first mobile system transceiver communicates via the second communications protocol; and at least one nontransitory processor-readable storage medium operatively coupled to the at least one mobile system processor and storing at least one of data or instructions which, when executed by the at least one mobile system processor, may cause the at least one mobile system processor to: send, via the first mobile system transceiver, at least one of instructions or data to the gateway luminaire; or receive, via the first mobile system transceiver, at least one of instructions or data from the gateway luminaire. The mobile system may include: a second mobile system transceiver operatively coupled to the at least one mobile system processor, wherein the at least one mobile system processor: may send, via the second mobile system transceiver, at least one of instructions or data to at least one remote processor-based device; or may receive, via the second mobile system transceiver, at least one of instructions or data from the remote processor-based device. The second mobile system transceiver may communicate via the first communications protocol. The second mobile system transceiver may communicate via a third communications protocol, the third communications protocol different from the first and second communications protocols. The third communications protocol may include a mobile telecommunications protocol. The at least one terminal luminaire processor: may receive, via the terminal luminaire transceiver, sensor data from at least one sensor; and may send, via the terminal luminaire transceiver, the received sensor data to the gateway luminaire. The at least one terminal luminaire processor: may store the sensor data temporarily in the nontransitory processor-readable storage medium of the terminal luminaire. The at least one sensor may include at least one of a motion sensor, a temperature sensor, a humidity sensor, a carbon monoxide sensor, a noise sensor, or a gunshot detection sensor. The illumination system may further include: a data storage device, including: at least one data storage device processor; a data storage device transceiver operatively coupled to the at least one data storage device processor; and at least one data storage device nontransitory processor-readable storage medium operatively coupled to the at least one data storage device processor and storing at least one of data or instructions which, when executed by the at least one data storage device processor, may cause the at least one data storage device processor to: receive, via the data storage device transceiver, sensor; and store the received sensor data in the at least one data storage device nontransitory processor-readable storage medium. The at least one gateway luminaire processor: may receive, via the first gateway luminaire transceiver, sensor data from at least one of the terminal luminaires; and may send, via the second gateway luminaire transceiver, the received sensor data to the at least one mobile system. The at least one sensor may include at least one of a motion sensor, a temperature sensor, a humidity sensor, a carbon monoxide sensor, a noise sensor, or a gunshot detection sensor.

A method of operating an illumination system, the illumination system including a plurality of terminal luminaires each including a terminal luminaire transceiver which communicates via a first communications protocol and a gateway luminaire including first and second gateway transceivers which communicate via first and second communications protocols, respectively, the method may be summarized as including: receiving, via the second gateway luminaire transceiver, at least one of instructions or data from at least one mobile system via the second communications protocol; and sending, via the first gateway luminaire transceiver, the received at least one of instructions or data to at least one of the plurality of terminal luminaires via the first communications protocol.

Receiving at least one of instructions or data from at least one mobile system may include receiving at least one of commissioning data, decommissioning data, dimming level data, light schedule data, firmware update data or operational parameter data from the at least one mobile system. The method may further include: receiving, via the first gateway luminaire transceiver, luminaire information from at least one of the terminal luminaires, the luminaire information including at least one of identifier information, operational information, or maintenance information for at least one of the terminal luminaires; and sending, via the second gateway luminaire transceiver, the received luminaire information to the at least one mobile system. The method may further include: receiving, via the first gateway luminaire transceiver, at least one of instructions or data from at least one of the plurality of terminal luminaires; and sending, via the second gateway luminaire transceiver, the received at least one of instructions or data to the at least one mobile system. The method may further include: sending, via a first mobile system transceiver of a mobile system, at least one of instructions or data to the gateway luminaire via the second communications protocol; or receiving, via the first mobile system transceiver of the mobile system, at least one of instructions or data from the gateway luminaire via the second communications protocol. The method may further include: sending, via a second mobile system transceiver of the mobile system, at least one of instructions or data to at least one remote processor-based device; or receiving, via the second mobile system transceiver of the mobile system, at least one of instructions or data from the gateway luminaire. Sending or receiving via the second mobile system transceiver may include sending or receiving at least one of instructions or data via the first communications protocol. Sending or receiving via the second mobile system transceiver may include sending or receiving at least one of instructions or data via a third communications protocol, the third communications protocol different from the first and second communications protocols. Sending or receiving via the second mobile system may include sending or receiving at least one of instructions or data via the third communications protocol, the third communications protocol including a mobile telecommunications protocol. The method may further include: receiving, via a data storage device transceiver communicatively coupled to a data storage device, sensor data; and storing the received sensor data in at least one data storage device nontransitory processor-readable storage medium of the data storage device. The method may further include: receiving, via a terminal luminaire transceiver of one of the plurality of terminal luminaires, sensor data from at least one sensor; and sending, via the terminal luminaire transceiver, the received sensor data to the gateway luminaire. Receiving sensor data from the at least one sensor may include receiving sensor data from at least one sensor which includes at least one of: a motion sensor, a temperature sensor, a humidity sensor, a carbon monoxide sensor, a noise sensor, or a gunshot detection sensor. The method may further include: receiving, via first gateway luminaire transceiver, sensor data from at least one of the terminal luminaires; and sending, via the second gateway luminaire transceiver, the received sensor data to the at least one mobile system. Receiving sensor data may include receiving sensor data which originates from at least one of: a motion sensor, a temperature sensor, a humidity sensor, a carbon monoxide sensor, a noise sensor, or a gunshot detection sensor.

An illumination system may be summarized as including: a plurality of terminal luminaires, each of the terminal luminaires including: at least one terminal luminaire processor; at least one light source operatively coupled to the at least one terminal luminaire processor; a terminal luminaire transceiver operatively coupled to the at least one terminal luminaire processor, in operation the terminal luminaire transceiver communicates via a first communications protocol; and at least one nontransitory processor-readable storage medium operatively coupled to the at least one terminal luminaire processor and storing at least one of data or instructions; a gateway luminaire including: at least one gateway luminaire processor; at least one light source operatively coupled to the at least one gateway luminaire processor; a first gateway luminaire transceiver operatively coupled to the at least one gateway luminaire processor, in operation the first gateway luminaire transceiver communicates via the first communications protocol; a second gateway luminaire transceiver operatively coupled to the at least one gateway luminaire processor, in operation the second gateway luminaire transceiver communicates via a second communications protocol, the second communications protocol different from the first communications protocol; and at least one nontransitory processor-readable storage medium operatively coupled to the at least one gateway luminaire processor and storing at least one of data or instructions which, when executed by the at least one gateway luminaire processor, cause the at least one gateway luminaire processor to: receive, via the first gateway luminaire transceiver, at least one of instructions or data from at least one of the plurality of terminal luminaires; and send, via the second gateway luminaire transceiver, the received at least one of instructions or data to at least one mobile system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
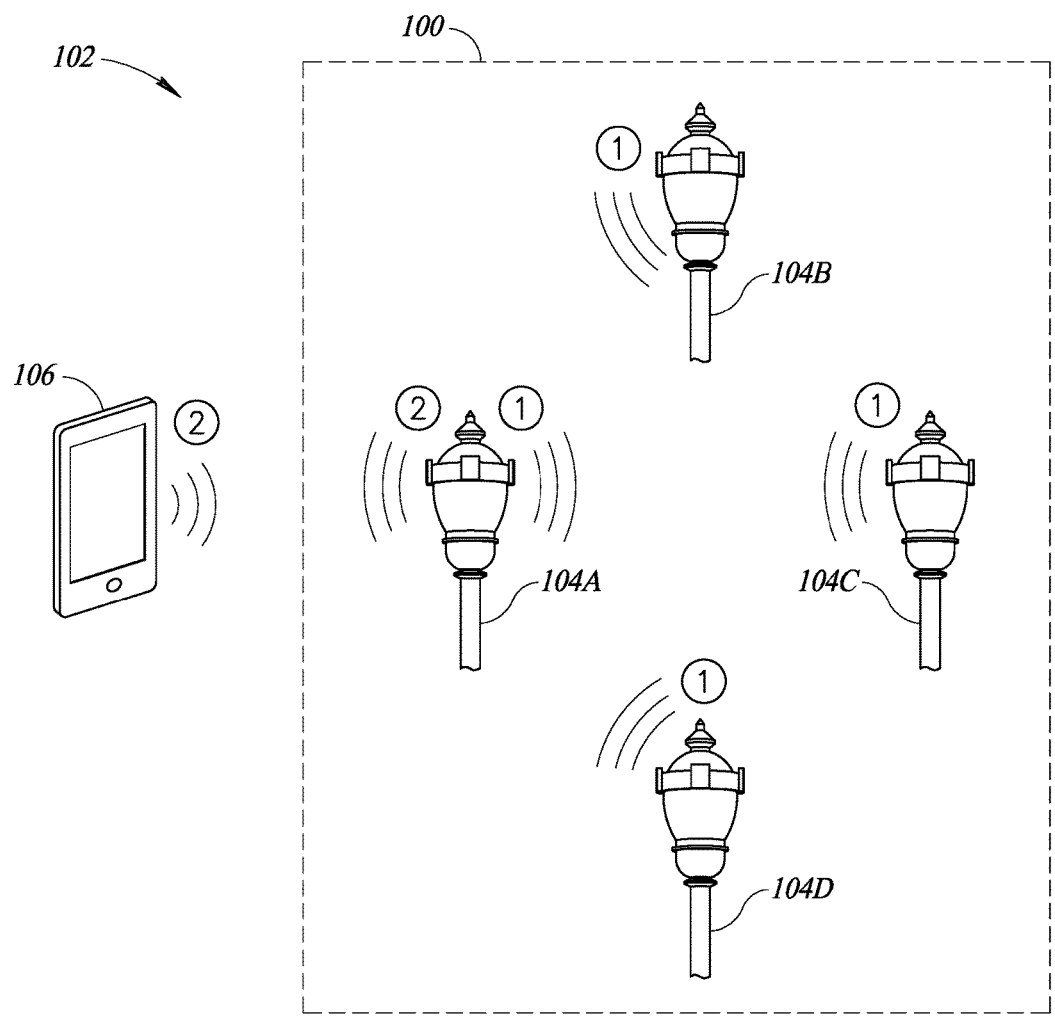
FIG. 1A is a pictorial diagram of an environment in which an illumination system may be implemented, according to at least one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide systems, methods and articles which utilize luminaires that include wireless communication capabilities that allow the luminaires to be controlled by a wireless-enabled mobile system or "smart appliance" disposed proximate the luminaires. One or more implementations discussed herein allow for control of a network of wireless-enabled luminaires via a single mobile system (e.g., smartphone, tablet, laptop computer, wearable computer) utilizing wireless communication without requiring connection between the luminaires and a central management system (CMS). Additionally, in at least some implementations, information collected from the luminaires through the mobile system may be uploaded via a mobile network interface to a central management system (CMS) or data repository. Further, in at least some implementations, the luminaires may use their wireless communication ability to obtain data from nearby wireless sensors, which sensor information may be collected by the mobile system from one or more luminaires in the network of luminaires when the mobile system is positioned proximate at least one of the luminaires. The sensor data and/or other data (e.g., luminaire-related data) may be uploaded to the CMS or data repository in a non-real-time period, for example.

FIG. 1A shows an example operating environment or area 100 for an illumination system 102 which includes a plurality wireless-enabled luminaires 104A-104D (four luminaires shown, collectively luminaires 104). The environment 100 may be a highway, park, shopping area, parking garage, city, campus, etc. As discussed further below, each of the luminaires 104 contains one or more wireless network interfaces operating together as a network with the ability to be controlled by a single mobile system 106 disposed proximate (e.g., within 150 meters, within 100 meters, within 50 meters) at least one of the luminaires 104. Although only the four luminaires 104A-D are shown for explanatory purposes, it should be appreciated than in practice some applications may have more or less than four luminaires (e.g., 2 luminaires, 100 luminaires, 1000 luminaires).

Figure 1B:
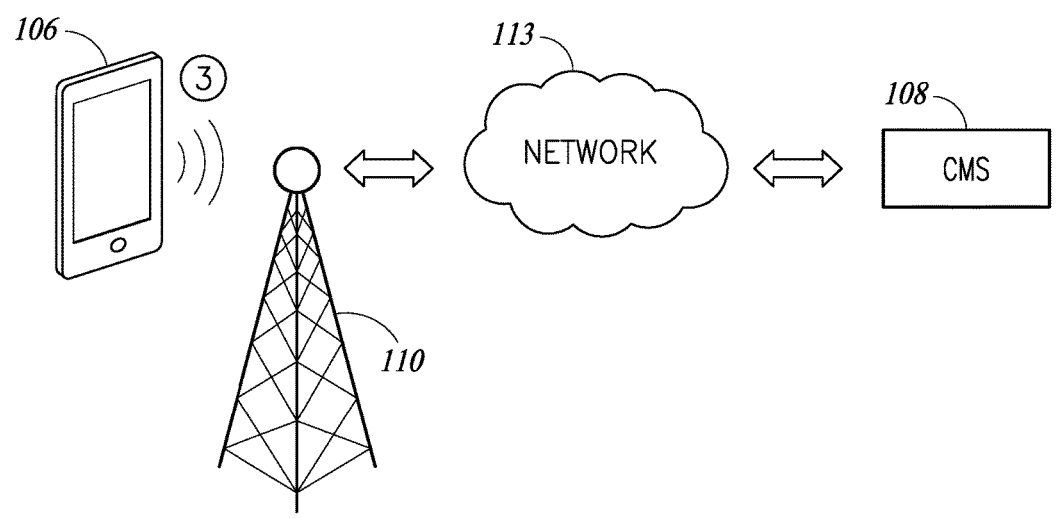
FIG. 1B is a pictorial diagram of a mobile system in communication with a central management system over a data communications network, according to one illustrated implementation.

In the illustrated implementation, the luminaire 104A is a gateway luminaire and the luminaires 104B, 104C and 104D are terminal luminaires. Each of the luminaires 104 contains at least one wireless interface capable of creating a network group within the geographic area 100, with the ability for all terminal luminaires 104B-D to communicate directly or indirectly with the gateway luminaire 104A. In at least some implementations, there may be more than one gateway luminaire 104A. The terminal luminaires 104B-D and the gateway luminaire 104A each include a wireless transceiver of a first type ("first type transceiver") that allows the luminaires to wirelessly communicate with each other via a first communications protocol (e.g., 802.15.4, Zigbee, 6Lowpan). Additionally, the gateway luminaire 104A contains a wireless transceiver of a second type (e.g., Bluetooth®), sometimes referred to herein as a "second type transceiver," which allows for wireless communication with the mobile system 106 via a second communications protocol different from the first communications protocol. As shown in FIG. 1B, the mobile system 106 may in turn communicate instructions and/or data with a central management system (CMS) 108 via a network 113. As an example, the mobile system 106 may communicate with the CMS 108 via a third communications protocol using a wireless transceiver of a third type ("third type transceiver"). In at least some implementations, the mobile system 106 may wirelessly communicate with an access point 110 (e.g., cellular tower, WIFI® access point) communicatively coupled to the CMS 108 via one or more suitable data communications networks 113 (e.g., mobile telecommunications network(s), Internet). The gateway luminaire 104A may act as a master coordination point for the terminal luminaires 104B-D.

Figure 2:
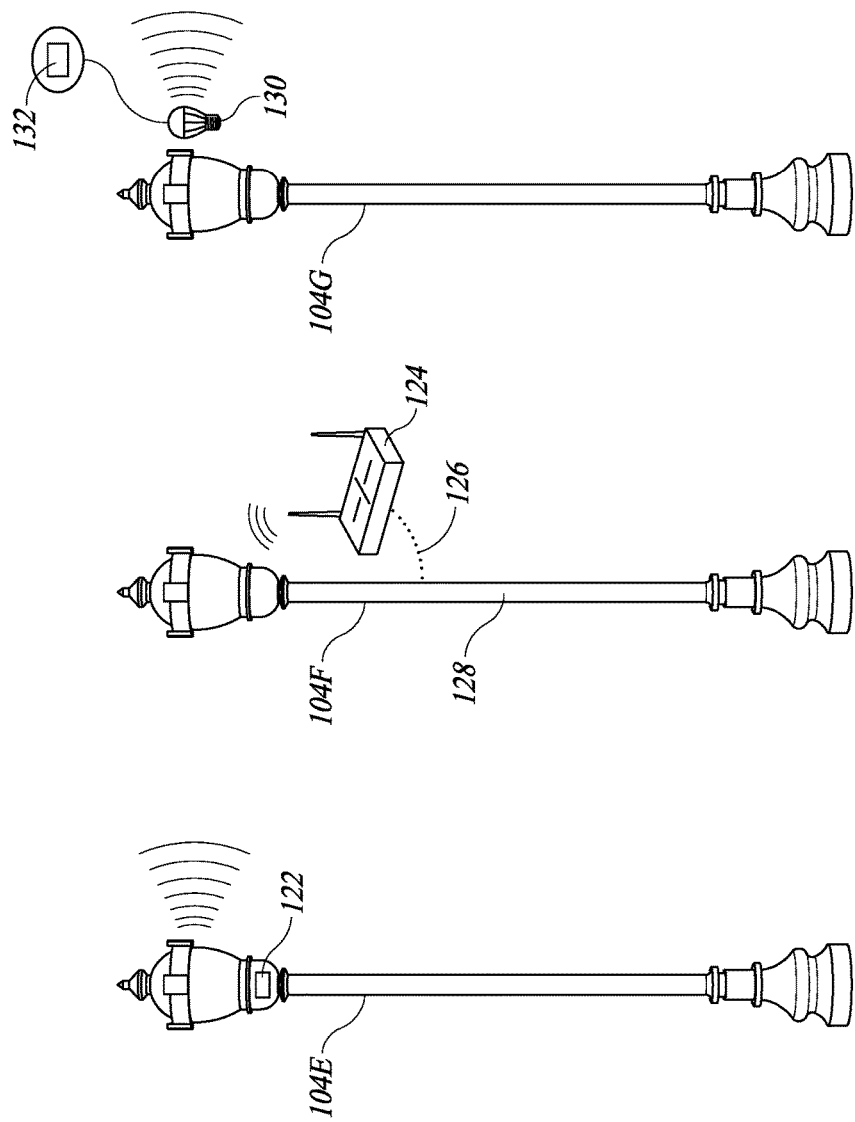
FIG. 2 is a pictorial diagram of a number of luminaires of the illumination system of FIG. 1A, according to at least one illustrated implementation.

FIG. 2 shows various non-limiting examples of how a wireless interface may be implemented for the luminaires of the present disclosure. In particular, FIG. 2 shows luminaires 104E, 104F and 104G. The luminaires 104E-G may be similar or identical to the luminaires 104A-D of FIG. 1A. In the illustrated example, the luminaire 104E contains a wireless network interface 122 integrated therein. The luminaire 104F may include a short-range wireless communications protocol (e.g., Bluetooth®) which communicates with a wireless network node 124 physically connected to or located nearby the luminaire 104F by a suitable connection 126. For example, the luminaire 104F may comprise an AreaMax™ LED area lighting fixture available from Evluma of Renton, Wash. In such implementations, the wireless network node 124 may act as a gateway node for the luminaire 104F to provide the luminaire 104F with access to the luminaire network. The wireless network node 124 may be physically coupled to a pole 128 of the luminaire 104F by the connection 126 which comprises one or more fasteners (e.g., brackets, bolts, nuts, screws). As another example, the luminaire 104G may include a retrofit lamp 130 which includes a wireless transceiver 132 integrated therein. For example, the retrofit lamp 130 may comprise an OmniMax™ LED area lighting fixture available from Evluma of Renton, Wash.

Referring back to FIG. 1A, the mobile system 106 may communicate with the gateway luminaire 104A via a short-range wireless communications protocol (e.g., Bluetooth®) when the mobile system is positioned proximate (e.g., within 100 meters) the gateway luminaire 104 by an operator. The gateway luminaire 104A communicates with the terminal luminaires 104B-D via a suitable wireless network (e.g., 802.15.4, Zigbee, 6Lowpan). In at least some implementations, the mobile system 106 is operative to control the luminaires 104A-104D for at least one of commissioning, decommissioning, setting dimming levels and schedules, setting operational parameters, providing firmware updates, etc. The luminaires 104 may be configured to operate as a group, as multiple groups with different parameters, or individually. The luminaires 104 may each retain their respective settings, which may be saved in nonvolatile memory associated with each of the luminaires. In at least some implementations, the mobile system 106 may also retrieve information from each of the luminaires 104, including information such as programmable settings, manufacturing information (e.g., model number, serial number, network ID), any operational or maintenance information or logs retained in the luminaire, etc.

Figure 3:
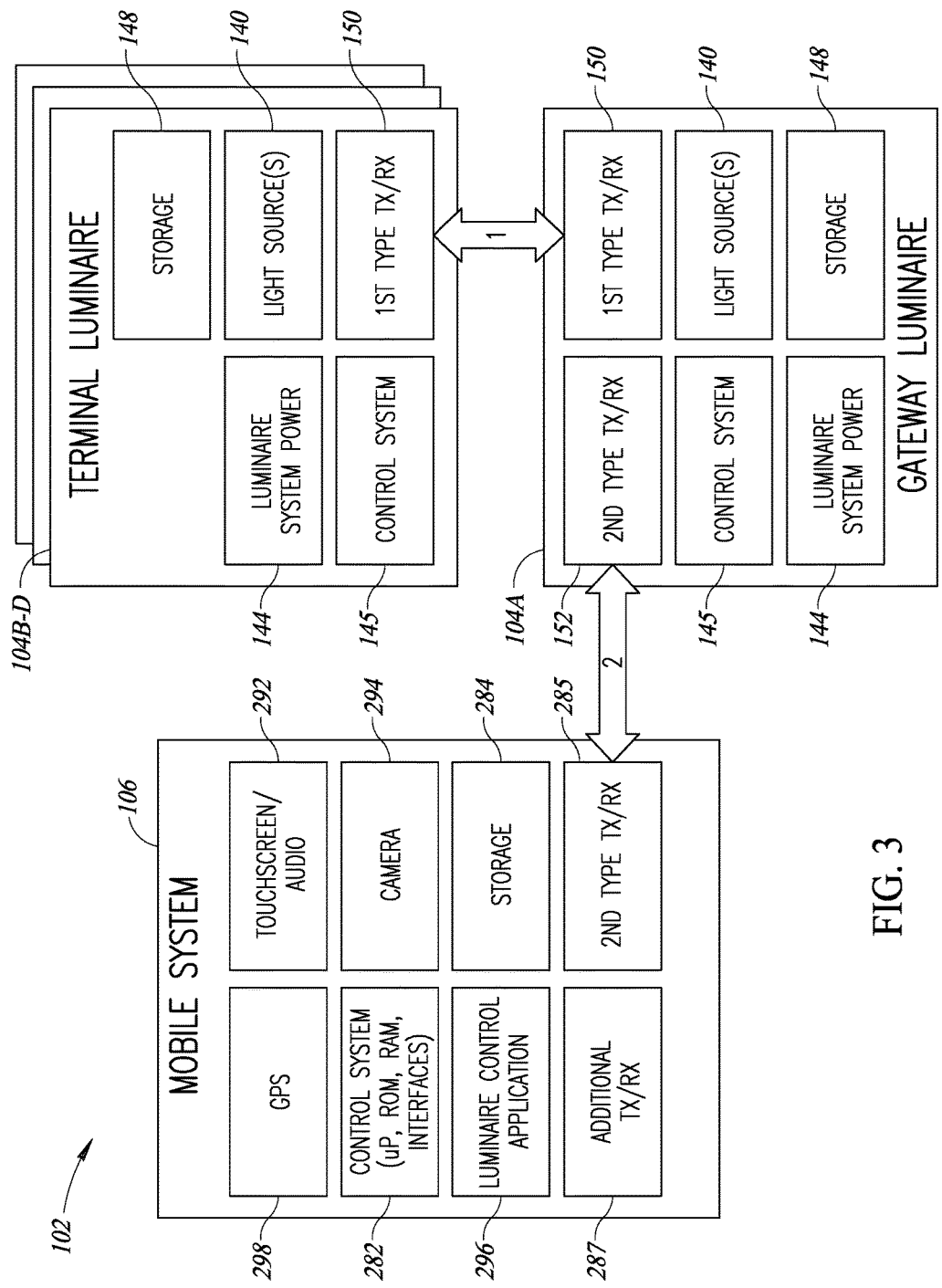
FIG. 3 is a functional block diagram of a gateway luminaire, a terminal luminaire, and a mobile system of the illumination system of FIGS. 1A-B, according to at least one illustrated implementation.
Figure 4:
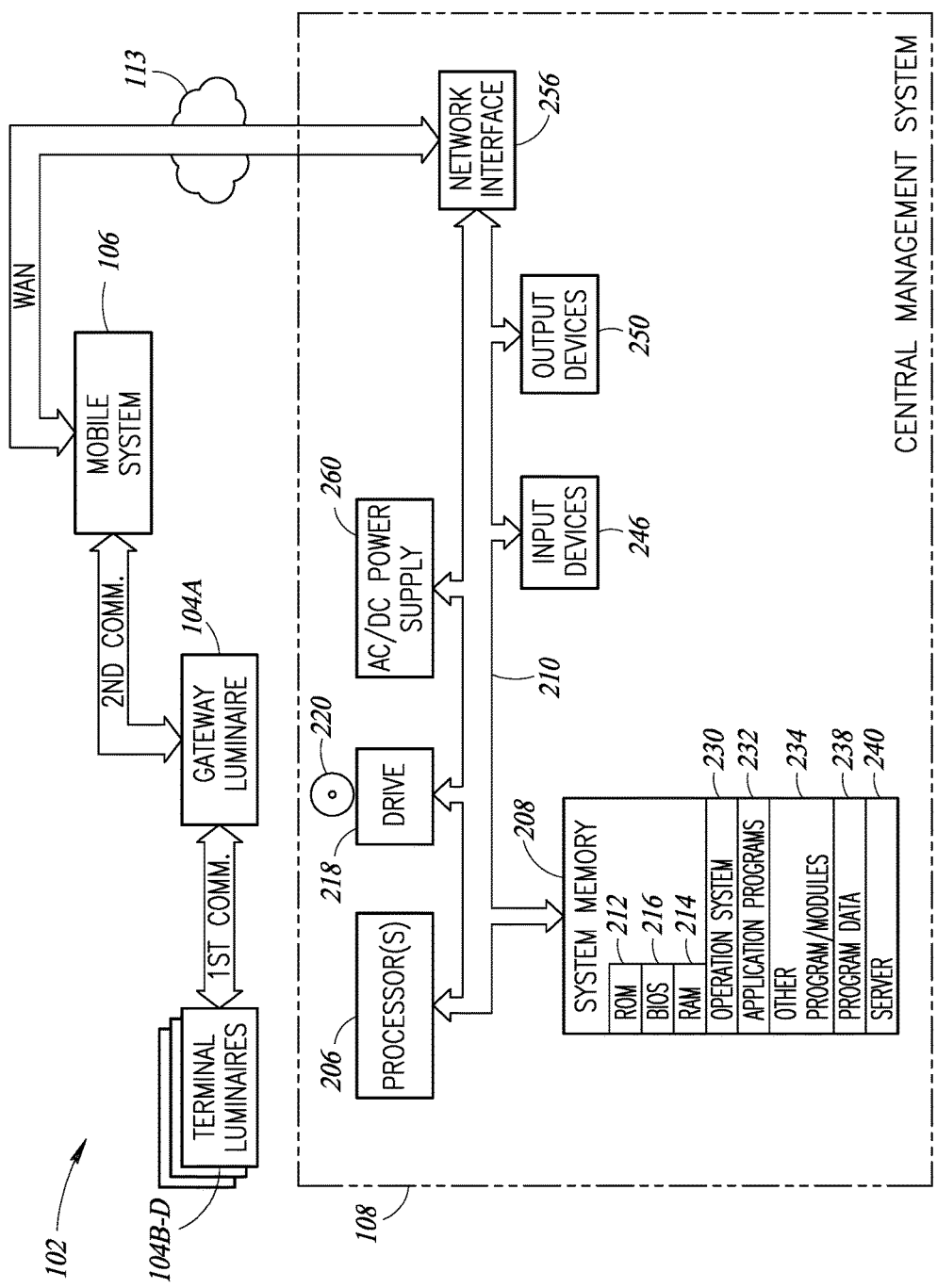
FIG. 4 is a functional block diagram of a central management system, a gateway luminaire, a terminal luminaire and a mobile system of the illumination system of FIGS. 1A-B, according to at least one illustrated implementation.

FIGS. 3 and 4 and the following discussion provide a brief, general description of the components forming the illustrative illumination system 102 including the central management system 108, the mobile systems 106, the gateway luminaire 104A and the terminal luminaires 104B-D in which the various illustrated implementations can be practiced. Although not required, some portion of the implementations will be described in the general context of computer-executable instructions or logic and/or data, such as program application modules, objects, or macros being executed by a computer. Those skilled in the relevant art will appreciate that the illustrated implementations as well as other implementations can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The central management system 108 may take the form of a PC, server, or other computing system executing logic or other machine executable instructions. The central management system 108 includes one or more processors 206, a system memory 208 and a system bus 210 that couples various system components including the system memory 208 to the processor 206. The central management system 108 will at times be referred to in the singular herein, but this is not intended to limit the implementations to a single system, since in certain implementations, there will be more than one central management system 108 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The central management system 108 may be implemented as a SCADA system or as one or more components thereof. Generally, a SCADA system is a system operating with coded signals over communication channels to provide control of remote equipment. The supervisory system may be combined with a data acquisition system by adding the use of coded signals over communication channels to acquire information about the status of the remote equipment for display or for recording functions.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIGS. 3 and 4 are of conventional design. As a result, such blocks need not be described in further detail herein, as they will be understood by those skilled in the relevant art.

The system bus 210 can employ any known bus structures or architectures. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the central management system 108, such as during start-up. Some implementations may employ separate buses for data, instructions and power.

The central management system 108 also may include one or more drives 218 for reading from and writing to one or more nontransitory computer- or processor-readable media 220 (e.g., hard disk, magnetic disk, optical disk). The drive 218 may communicate with the processor 206 via the system bus 210. The drive 218 may include interfaces or controllers (not shown) coupled between such drives and the system bus 210, as is known by those skilled in the art. The drives 218 and their associated nontransitory computer- or processor-readable media 220 provide nonvolatile storage of computer-readable instructions, data structures, program modules and other data for the central management system 108. Those skilled in the relevant art will appreciate that other types of computer-readable media may be employed to store data accessible by a computer.

Program modules can be stored in the system memory 208, such as an operating system 230, one or more application programs 232, other programs or modules 234, and program data 238.

The application program(s) 232 may include logic capable of providing the luminaire management functionality described herein. For example, applications programs 232 may include programs to analyze and organize luminaire information automatically received from the luminaires 104. The application programs 232 may also include programs to present raw or analyzed illumination information in a format suitable for presentation to a user.

The system memory 208 may include communications programs 240 that permit the central management system 108 to access and exchange data with other networked systems or components, such as the luminaires 104, the mobile systems 106, and/or other computing devices.

While shown in FIG. 4 as being stored in the system memory 208, the operating system 230, application programs 232, other programs/modules 234, program data 238 and communications 240 can be stored on the nontransitory computer- or processor-readable media 220 or other nontransitory computer- or processor-readable media.

Personnel can enter commands (e.g., system maintenance, upgrades) and information (e.g., parameters) into the central management system 108 using one or more communicably coupled input devices 246 such as a touch screen or keyboard, a pointing device such as a mouse, and/or a push button. Other input devices can include a microphone, joystick, game pad, tablet, scanner, biometric scanning device, etc. These and other input devices may be connected to the processing unit 206 through an interface such as a universal serial bus ("USB") interface that couples to the system bus 210, although other interfaces such as a parallel port, a game port or a wireless interface or a serial port may be used. One or more output devices 250, such as a monitor or other display device, may be coupled to the system bus 210 via a video interface, such as a video adapter. In at least some instances, the input devices 246 and the output devices 250 may be located proximate the central management system 108, for example when the system is installed at the system user's premises. In other instances, the input devices 246 and the output devices 250 may be located remote from the central management system 108, for example when the system is installed on the premises of a service provider.

In some implementations, the central management system 108 uses one or more of the logical connections to communicate with one or more mobile systems 106, remote computers, servers and/or other devices via one or more communications channels, for example, the one or more networks 113. These logical connections may facilitate any known method of permitting computers to communicate, such as through one or more LANs and/or WANs. Such networking environments are known in wired and wireless enterprise-wide computer networks, intranets, extranets, and the Internet.

In some implementations, a network port or interface 256, communicatively linked to the system bus 210, may be used for establishing and maintaining communications over the communications network 113.

The central management system 108 may include an AC/DC power supply 260. The AC/DC power supply 260 converts AC power from a power source (e.g., AC mains) into DC power, which may be provided to power the various components of the central management system 108.

In the illumination system 102, program modules, application programs, or data, or portions thereof, can be stored in one or more computing systems. Those skilled in the relevant art will recognize that the network connections shown in FIG. 4 are only some examples of ways of establishing communications between computers, and other connections may be used, including wireless. In some implementations, program modules, application programs, or data, or portions thereof, can even be stored in other computer systems or other devices (not shown).

For convenience, the processor 206, system memory 208, network port 256 and devices 246, 250 are illustrated as communicatively coupled to each other via one or more buses 210, thereby providing connectivity between the above-described components. In alternative implementations, the above-described components may be communicatively coupled in a different manner than illustrated in FIG. 4. For example, one or more of the above-described components may be directly coupled to other components, or may be coupled to each other, via intermediary components (not shown). In some implementations, the one or more buses 210 are omitted and the components are coupled directly to each other using suitable connections.

It should be appreciated that the luminaires 104 may include components similar to those components present in the central management system 108, including the processor 206, power supply 260, buses, nontransitory computer- or processor-readable media, wired or wireless communications interfaces, and one or more input and/or output devices.

The mobile system 106 can include any device, system or combination of systems and devices having at least wireless communications capabilities. In most instances, the mobile system 106 includes additional devices, systems, or combinations of systems and devices capable of providing graphical data display capabilities. Examples of such systems 106 can include without limitation, cellular telephones, smart phones, tablet computers, desktop computers, laptop computers, ultraportable or netbook computers, personal digital assistants, handheld devices, wearable computers, other smart appliances, and the like.

In at least some implementations, the luminaires 104 include a satellite positioning receiver such as GPS receiver, Glonass, etc., and store their position data in nontransitory computer- or processor-readable media or memory. The position data may only need to be acquired relatively infrequently, thus enabling location data to be acquired in poor reception areas or with relatively low cost receiver hardware.

The mobile system 106 may include a control system or processor 282 and associated nontransitory computer- or processor-readable media or memory, for instance one or more data stores 284 that may include nonvolatile memories such as read only memory (ROM) or FLASH memory and/or one or more volatile memories such as random access memory (RAM).

The mobile system 106 may include one or more transceivers or radios and associated antennas. For example, the mobile system 106 may include one or more transceivers 285 of a second type ("second type transceiver") which facilitate communication with the gateway luminaire 104A. As an example, the second type transceiver 285 may include a Bluetooth® transceiver or other short-range wireless communications transceiver. Additionally, the mobile system 106 may include one or more additional transceivers 287. For example, the mobile system 106 may include one or more cellular transceivers or radios and one or more short-range transceivers or radios, such as Wi-Fi® transceivers or radios, along with associated antennas. The mobile system 106 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabit Ethernet®, for example.

The mobile system 106 may include a user input/output subsystem 292, for example including a touchscreen or touch sensitive display device and one or more speakers. The touchscreen or touch sensitive display device may include any type of touchscreen including, but not limited to, a resistive touchscreen or a capacitive touchscreen. The touchscreen or touch sensitive display device may present a graphical user interface, for example in the form of a number of distinct screens or windows, which include prompts and/or fields for selection. The touchscreen or touch sensitive display device may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example an alphanumeric keypad, a QWERTY keyboard, a joystick, scroll wheel, touchpad or similar physical or virtual input device.

The mobile system 106 may include one or more image capture devices 294, for example, cameras with suitable lenses, and optionally one or more flash or lights for illuminating a field of view to capture images. The image capture device(s) 294 may capture still digital images or moving or video digital images. Image information may be stored as files via the data store 284, for example.

Some or all of the components within the mobile system 106 may be communicably coupled using at least one bus (not shown) or similar structure adapted to transferring, transporting, or conveying data between the devices, systems, or components used within the mobile system 106. The bus can include one or more serial communications links or a parallel communications link such as an 8-bit, 16-bit, 32-bit, or 64-bit data bus. In some implementations, a redundant bus (not shown) may be present to provide failover capability in the event of a failure or disruption of a primary bus.

The control system or processor(s) 282 may include any type of processor (e.g., ARM Cortex-A8, ARM Cortex-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 282, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 282 upon initial application of power. The processor(s) 282 may also execute one or more sets of logic or one or more machine executable instruction sets loaded from volatile memory subsequent to the initial application of power to the processor 282. The processor 282 may also include a system clock, a calendar, or similar time measurement devices. One or more geolocation devices, for example a Global Positioning System (GPS) receiver 298 may be communicably coupled to the processor 282 to provide additional functionality such as geolocation data to the processor 282.

The transceivers or radios 285 and 287 can include any device capable of transmitting and receiving communications via electromagnetic energy.

Non-limiting examples of cellular communications transceivers or radios 287 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 287 can include more than one interface. For example, in some instances, the cellular transceivers or radios 287 can include at least one dedicated, full- or half-duplex, voice call interface and at least one dedicated data interface. In other instances, the cellular transceivers or radios 287 can include at least one integrated interface capable of contemporaneously accommodating both full- or half-duplex voice calls and data transfer.

Non-limiting examples of W-Fi® short-range transceivers or radios 287 include various chipsets available from Broadcom, including BCM43142, BCM4313, BCM94312MC, BCM4312, and chipsets available from Atmel, Marvell, or Redpine. Non-limiting examples of Bluetooth® short-range transceivers or radios 285 include various chipsets available from Nordic Semiconductor, Texas Instruments, Cambridge Silicon Radio, Broadcom, and EM Microelectronic.

As noted, the data store 284 can include non-volatile storage memory and in some implementations may include volatile memory as well. At least a portion of the data store 284 may be used to store one or more processor executable instruction sets for execution by the processor 282. In some implementations, all or a portion of the memory may be disposed within the processor 282, for example in the form of a cache. In some implementations, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing luminaire control applications or "apps" 296 executable by the processor 282 may be stored in whole or in part in at least a portion of the memory 284. In at least some instances, the applications 296 may be downloaded or otherwise acquired by the end user. In some implementations, such applications 296 may start up in response to selection of a corresponding user selectable icon by the user. The applications 296 can facilitate establishing a data link between the mobile system 106 and the central management system 108 or the luminaires 104 via the transceivers or radios 285, 287 and communication networks 113.

As shown in FIG. 3, each of the luminaires 104 includes one or more light sources 140, a power supply 144, a local illumination control system (ICS) 145 (e.g., one or more processors), a nontransitory data store 148, and a first type transceiver 150 which communicates via a first wireless communications protocol (e.g., Wi-Fi®). Additionally, the gateway luminaire 104A includes a second type transceiver 152 which communicates via the second wireless communications protocol (e.g., Bluetooth®). The second type transceiver 152 of the gateway luminaire 104A provides wireless communications capabilities which allow the luminaire 104A to be communicatively coupled with the mobile system 106. The respective first transceivers 150 of the luminaires 104 allow for communication between the network of luminaires 104.

During installation, testing or setup of the luminaires 104, the mobile system 106 positioned proximate the gateway luminaire 104A by an operator may transmit information (e.g., geographical coordinates, configuration information, operational information) to the gateway luminaire over a data communications channel (e.g., Bluetooth®). The mobile system 106 may additionally or alternatively receive information from the gateway luminaire 104A pertaining to the gateway luminaire, one or more terminal luminaires 104B-D, one or more sensors, etc.

In at least some implementations, each of the luminaires 104 is programmed with a unique identifier (e.g., identification number, such as a serial number). The unique identifier uniquely identifies the respective luminaire with respect to all other luminaires in an installation, or installed base, asset collection, or inventory of an entity. The unique identifier may be programmed or otherwise stored in the nontransitory data store 118 during manufacture, during installation, or at any other time. The unique identifier may be programmed using the mobile system 106, a factory programming fixture, DIP switches, or using any other suitable method.

Once the luminaires 104 have received their respective identification information and any other configuration information, the luminaires may send such information to the central management system 108 via the gateway luminaire 104A and the mobile system 106 for storage by the central management system. As discussed in further detail below, the central management system 108 may utilize the received luminaire information to build an asset management table. The central management system 108 may also include mapping functions that generate an asset management map which may visually present luminaire information to one or more users. The central management system 108 may also analyze the collected data and generate one or more electronic reports that are valuable for users associated with the illumination system 102.

The local ICS 145 of each of the luminaires 104 may include a photocontrol, or an interface to a photocontrol, that has a photosensitive transducer (photosensor) associated therewith. The ICS 145 may be operative to control operation of the light sources 140 based on ambient light levels detected by the photosensor. The ICS 145 may provide illumination data signals to control the light sources 140. The ICS 145 may also include a switch that provides electrical power to the light sources 140 only when detected light levels are below a desired level. For example, the local ICS 145 of each of the luminaires 104 may include a photosensor that controls an electro-mechanical relay coupled between a source of electrical power and a control device (e.g., a magnetic or electronic transformer) within the luminaires. The electro-mechanical relay may be configured to be in an electrically continuous state unless a signal from the photosensor is present to supply power to the luminaires 104. If the photosensor is illuminated with a sufficient amount of light, the photosensor outputs the signal that causes the electro-mechanical relay to switch to an electrically discontinuous state such that no power is supplied to the luminaires 104.

In some implementations, the ICS 145 may include one or more clocks or timers, and/or one or more look-up tables or other data structures that indicate dawn events and dusk events for one or more geographical locations at various times during a year. The time of occurrence of various solar events may additionally or alternatively be calculated using geolocation, time, or date data either generated by or stored within a nontransitory processor-readable medium of the luminaires 104 or obtained from one or more external devices via one or more wired or wireless communication interfaces either in or communicably coupled to the luminaire. In some implementations, the ICS 145 is implemented partially or fully by one or more processors.

The power supply 144 of the luminaires 104 may be electrically coupled with a power distribution system. The power supply 144 may receive an AC power signal from the power distribution system, generate a DC power output, and supply the generated DC power output to the light sources 140 to power the light sources as controlled by light source control commands from the ICS 145.

The light sources 140 may include one or more of a variety of conventional light sources, for example, incandescent lamps or fluorescent lamps such as high-intensity discharge (HID) lamps (e.g., mercury vapor lamps, high-pressure sodium lamps, metal halide lamps). The light sources 140 may also include one or more solid-state light sources (e.g., light emitting diodes (LEDs), organic LEDs (OLEDs), polymer LEDs (PLEDs)).

The mobile system 106 may receive luminaire information from each of the luminaires 104 in the illumination system 102. For example, in some implementations the mobile system 106 may interrogate the luminaires 104 via the gateway luminaire 104A and receive signals from each of the luminaires that provide luminaire information. When the mobile system is disconnected from the luminaire network, the mobile system 106 may send such information to the central management system 108, as discussed above. Additionally or alternatively, the mobile system 106 may communicate with the central management system 108 while connected to the luminaire network. Similarly, the mobile system 106 may send information (e.g., control information, operational parameter information) to the luminaires 104 via the gateway luminaire 104A. Such information may emanate from the mobile system 106 itself (e.g., entered by an operator, stored in memory) or may be received from another system, such as the central management system 108 via one or more data communications networks (e.g., networks 113).

The central management system 108 may store the luminaire information in one or more nontransitory computer- or processor-readable media (e.g., nontransitory computer- or processor-readable media 220 of FIG. 4). The luminaire information may include, for example, identification information, location information, installation date, installation cost, installation details, type of luminaire, maintenance activities, specifications, purchase date, cost, expected lifetime, warranty information, service contracts, service history, spare parts, comments, or anything other information that may be useful to users (e.g., management, analysts, purchasers, installers, maintenance workers).

Logged data from each of the networked luminaires 104 can be retrieved and passed to the central management system 108 or other data repository via the mobile system 106 and gateway luminaire 104A when the mobile system is connected to the luminaire network or disconnected therefrom. This information may contain any available information from the luminaires, including operational and maintenance data, performance data such as power usage, and asset management data such as luminaire model, serial number, and location (if available).

Advantageously, the illumination system 102 shown in FIGS. 1-4 can be implemented without requiring a connection between the luminaires 104 and the central management system 108. For small deployments of outdoor luminaires (e.g., smaller cities and towns), the cost and complexity of implementing a complete real-time control center may be prohibitive and may provide little day-to-day value. In at least some implementations of the present disclosure, the mobile system 106 may be sent into the field only when changes to the network lighting controls is required or collection of the luminaire data is desired or convenient. Further, the mobile system 106 may be deployed to just the location of the gateway luminaire 104A for control of the entire network of luminaires 104 instead of having to go to each terminal luminaire individually.

Further, in at least some of the implementations of the present disclosure network security is increased significantly over traditional luminaire network deployments. Since the network of luminaires 104 may not be connected to the Internet, no attacks can be generated on the infrastructure through web-based cyber-attacks. An attacker would need to physically be on the wireless network with the ability to intercept wireless communications to affect the network of luminaires 104 in the illumination system 102. Further, network security is increased since the illumination system 102 may be connected to the Internet only during brief intervals when the mobile system 106 is connected to the Internet when communicating with the central management system 108 over a network (e.g., mobile network). In at least some implementations, this risk can be completely eliminated as a threat if the mobile system 106 does not connect to a mobile network while communicating with the luminaires (e.g., gateway luminaire 104A), and instead is taken to a remote location off of the luminaire network or is simply disconnected from the luminaire network before connecting to the central management system 108 or data repository via a suitable wired and/or wireless connection.

The data distribution and collection by the mobile system 106 allows periodic information to be manually initiated by a data collection user and added to a repository without the need for having a complete end-to-end real-time control and monitoring center in place. The data can be refreshed periodically and can be made available on-demand.

Figure 5:
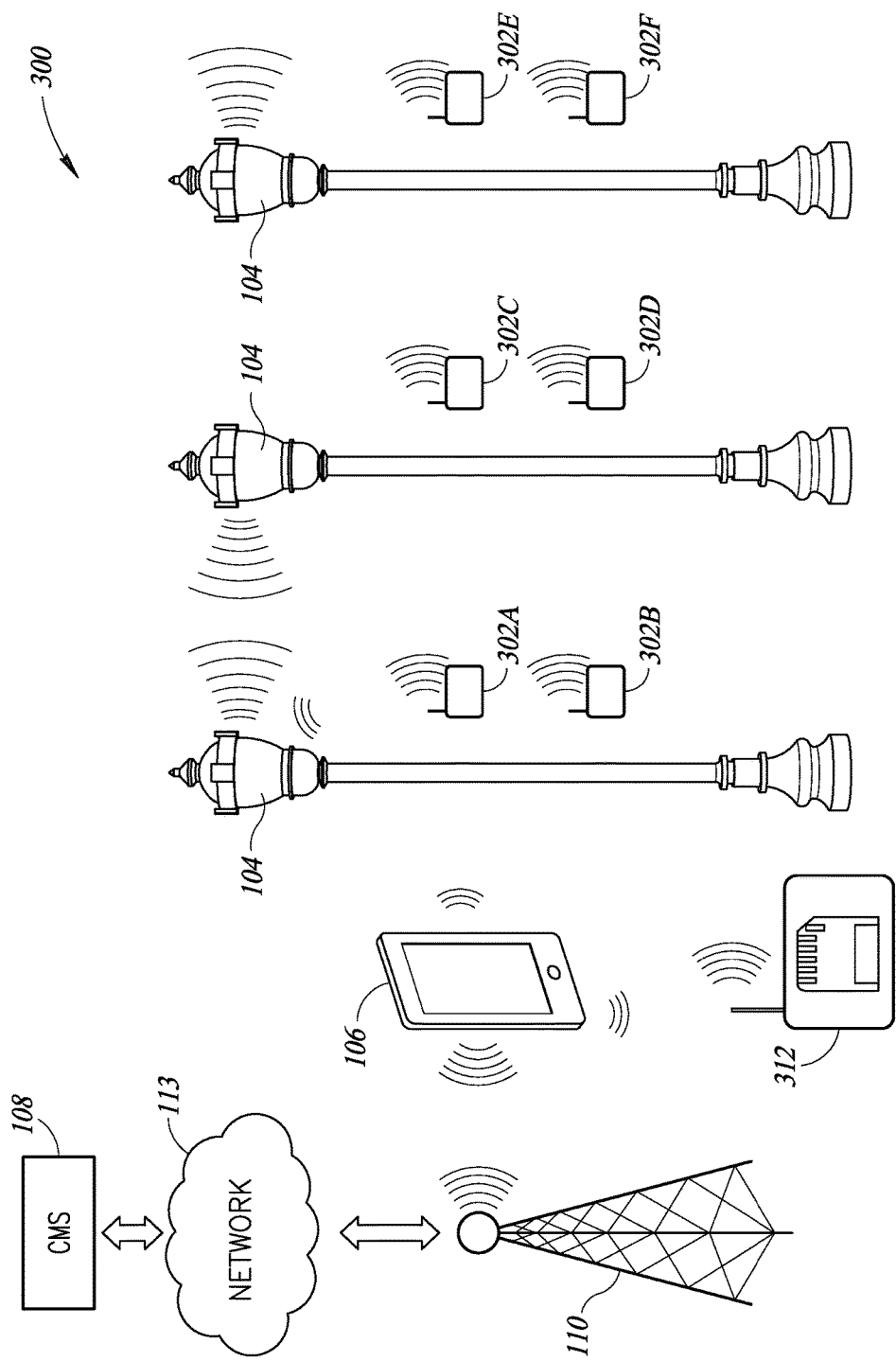
FIG. 5 is a pictorial diagram of an illumination system that gathers data from a plurality of wireless sensors, according to one illustrated implementation.
Figure 6:
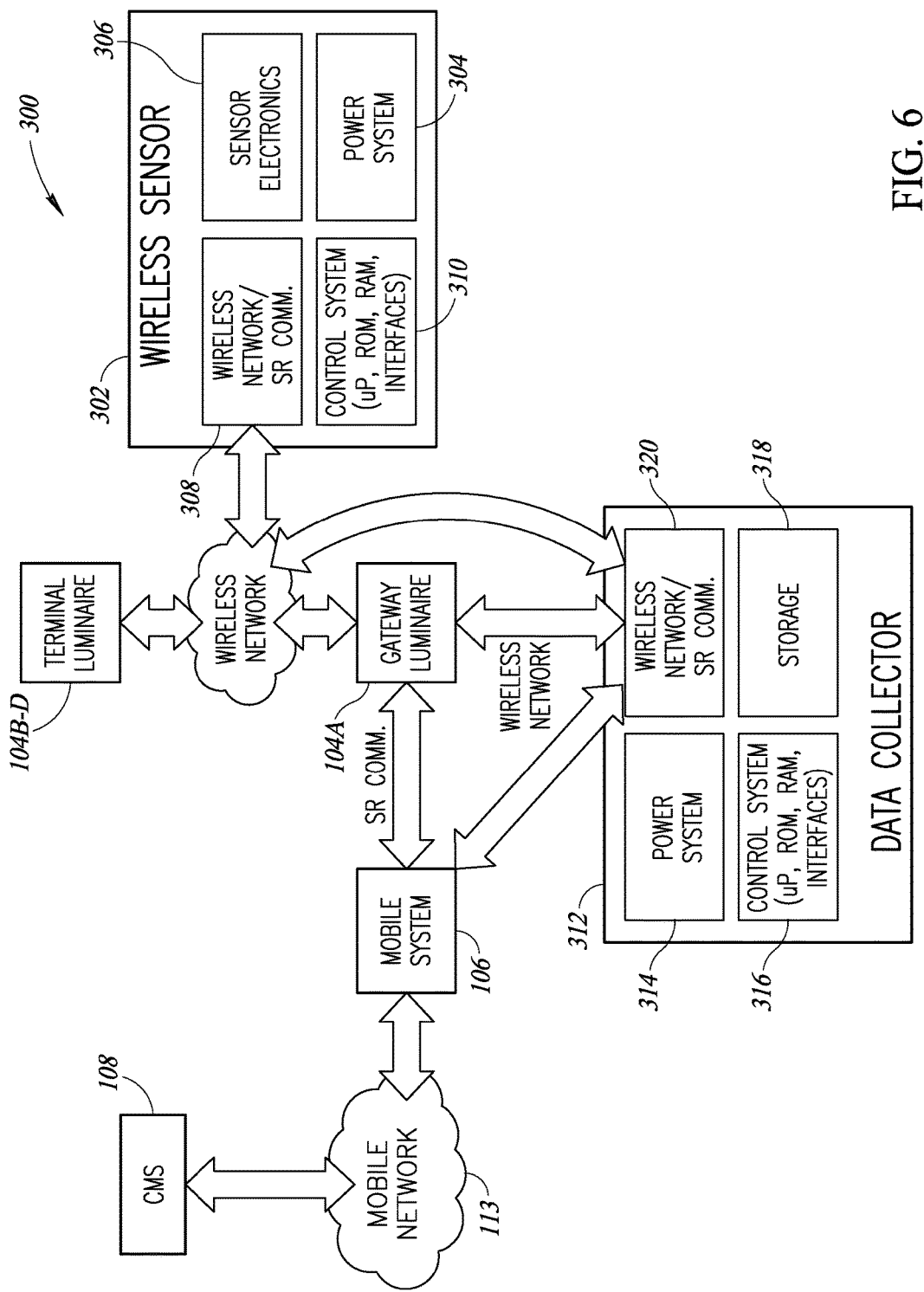
FIG. 6 is a functional block diagram of the illumination system of FIG. 5, according to one illustrated implementation.

FIGS. 5 and 6 illustrate another implementation of an illumination system 300. The illumination system 300 is similar or identical to the illumination system 102 in many respects, so the discussion below concentrates only on the differences between the two systems for the sake of brevity.

The illumination system 300 provides a mobile system-enabled data collection network which includes a plurality of luminaires 104. One or more of the luminaires 104 may obtain periodic sensor data from one or more sensors 302A-F (collectively, sensors 302) and temporarily store it locally in the luminaire, and may deliver the sensor data over a short-range wireless communications protocol to the mobile system 106, which in turn may deliver the data to the central management system 108 over a suitable network (e.g., mobile network) when the mobile system is disconnected from the luminaire network (offline) or when the mobile system is connected to the luminaire network (online). As an example, each of the one or more sensors 302A-302F may gather sensor data (e.g., continuously, periodically, from time-to-time) and may send the sensor data to one of the luminaires 104 for temporary storage in the luminaire. In some implementations, the one or more of the terminal luminaires 104 may obtain sensor data from the one or more sensors 302 and temporarily store it locally in the luminaire, which data may be sent by the terminal luminaires to one or more gateway luminaires to be delivered thereby to the mobile system 106, and ultimately to the central management system 108, as discussed above.

In operation, the luminaires 104 may network with the communication-enabled sensors 302 that collect information from areas proximate the illumination system 300 and from time-to-time send data to the mobile system 106, which may from time-to-time send the data to the central management system 108 or other data repository in offline or online mode. Non-limiting examples of sensors may include a motion sensor (e.g., traffic sensor, a pedestrian sensor, a parking space usage sensor), a temperature sensor, a humidity sensor, a carbon monoxide sensor, a noise sensor, a gunshot detection sensor, etc.

Each of the luminaires 104 contains wireless network communication capability, either single wireless network capability or dual wireless network and short-range network (e.g., Bluetooth®) capability, as discussed above. Each of the sensors 302 includes a power system 304, sensor electronics 306, a control system 310, and at least one transceiver 308 (e.g., wireless network and/or short-range communications protocol, such as Bluetooth®). The sensors 302 may be battery-powered or may receive power from a luminaire pole to which the sensor is coupled. The sensors 302 can be any sensors that detect events or periodically record any type of measurement.

In at least some implementations, a wireless data collector 312 (e.g., network attached storage) may be positioned proximate at least one of the luminaires 104 and may be coupled to the network of luminaires 104. The data collector 312 may include a power system 314, a control system 316, data storage 318, and one or more wireless transceivers 320. In operation, the data collector 312 wirelessly receives and stores a large dataset from multiple sensors 302 for a period of time. The data collector 312 can be positioned anywhere in coverage of the wireless network where it has access to receiving data from any of the sensors 302 directly or via one or more of the luminaires 104. The data collector 312 may be a separate component or may be integrated into a single luminaire or integrated into multiple luminaires (e.g., data storage distributed across multiple luminaires).

Upon a trigger to capture data, the sensors 302 may transfer the data to the data collector 312 over the wireless network. The mobile system 106 may periodically connect to the gateway luminaire 104A (e.g., over Bluetooth®), which enables the mobile system to access the sensor data stored by the data collector 312 and to transfer the set of data to the central management system 108 or other remote repository. In at least some implementations, the data collector 312 may also be enabled for short-range wireless communication (e.g., Bluetooth®), which allows for direct connection between the data collector 312 and the mobile system 106.

The illumination system 300 of FIGS. 5 and 6 advantageously leverages the luminaire control and data collection network to add additional data collection capabilities from sensors, and does not require a fully deployed centralized management system for collection of the sensor information. Further, as with the illumination system 102 discussed above, for the illumination system 300 network security is increased over traditional luminaire network deployments since the luminaire network is optionally connected to the Internet only during brief intervals when the mobile system 106 is connected to the luminaire network and a mobile network. This risk can be completely eliminated as a threat to the luminaire network if the mobile system 106 does not connect to a mobile network when connected to the luminaire network, and instead is taken to a remote location off of the luminaire network before connecting to the central management system 108 or other data repository.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Patent Publication No. 2016/0037605, published Feb. 4, 2016; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Provisional Patent Application No. 62/397,713, filed Sep. 21, 2016; U.S. Provisional Patent Application No. 62/327,939, filed Apr. 26, 2016; U.S. Provisional Patent Application No. 62/379,037, filed Aug. 24, 2016; and U.S. Provisional Patent Application No. 62/458,970, filed Feb. 14, 2017 are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An illumination system, comprising:
a plurality of terminal luminaires, each of the terminal luminaires comprising:
at least one terminal luminaire processor;
at least one light source operatively coupled to the at least one terminal luminaire processor;
a terminal luminaire transceiver operatively coupled to the at least one terminal luminaire processor, in operation the terminal luminaire transceiver communicates via a first communications protocol; and
at least one nontransitory processor-readable storage medium operatively coupled to the at least one terminal luminaire processor and storing at least one of data or instructions;
a gateway luminaire comprising:
at least one gateway luminaire processor;
at least one light source operatively coupled to the at least one gateway luminaire processor;
a first gateway luminaire transceiver operatively coupled to the at least one gateway luminaire processor, in operation the first gateway luminaire transceiver communicates via the first communications protocol;
a second gateway luminaire transceiver operatively coupled to the at least one gateway luminaire processor, in operation the second gateway luminaire transceiver communicates via a second communications protocol, the second communications protocol different from the first communications protocol; and
at least one nontransitory processor-readable storage medium operatively coupled to the at least one gateway luminaire processor and storing at least one of data or instructions which, when executed by the at least one gateway luminaire processor, cause the at least one gateway luminaire processor to:
receive, via the second gateway luminaire transceiver, at least one of instructions or data from at least one mobile system; and
send, via the first gateway luminaire transceiver, the received at least one of instructions or data to at least one of the plurality of terminal luminaires.

2. The illumination system of claim 1 wherein at least some of the plurality of terminal luminaires communicate with other of the plurality of terminal luminaires using the first communications protocol via respective terminal luminaire transceivers.

3. The illumination system of claim 1 wherein each of the plurality of terminal luminaires communicates with at least one gateway luminaire using the first communications protocol via respective terminal luminaire transceivers.

4. The illumination system of claim 1 wherein the first and second communication protocols are wireless communications protocols, the first and second communications protocols have first and second ranges, respectively, and the first range is greater than the second range.

5. The illumination system of claim 1 wherein the at least one gateway luminaire processor:
receives, via the second gateway luminaire transceiver, at least one of commissioning data, decommissioning data, dimming level data, light schedule data, firmware update data or operational parameter data from the at least one mobile system.

6. The illumination system of claim 1 wherein the at least one gateway luminaire processor:
receives, via the first gateway luminaire transceiver, at least one of instructions or data from at least one of the plurality of terminal luminaires; and
sends, via the second gateway luminaire transceiver, the received at least one of instructions or data to the at least one mobile system.

7. The illumination system of claim 1, further comprising:
a mobile system comprising:
at least one mobile system processor;
a first mobile system transceiver operatively coupled to the at least one mobile system processor, in operation the first mobile system transceiver communicates via the second communications protocol; and
at least one nontransitory processor-readable storage medium operatively coupled to the at least one mobile system processor and storing at least one of data or instructions which, when executed by the at least one mobile system processor, cause the at least one mobile system processor to:
send, via the first mobile system transceiver, at least one of instructions or data to the gateway luminaire; or
receive, via the first mobile system transceiver, at least one of instructions or data from the gateway luminaire.

8. The illumination system of claim 7 wherein the mobile system comprises:
a second mobile system transceiver operatively coupled to the at least one mobile system processor, wherein the at least one mobile system processor:
sends, via the second mobile system transceiver, at least one of instructions or data to at least one remote processor-based device; or receives, via the second mobile system transceiver, at least one of instructions or data from the remote processor-based device.

9. The illumination system of claim 8 wherein the second mobile system transceiver communicates via the first communications protocol.

10. The illumination system of claim 8 wherein the second mobile system transceiver communicates via a third communications protocol, the third communications protocol different from the first and second communications protocols.

11. The illumination system of claim 10 wherein the third communications protocol comprises a mobile telecommunications protocol.

12. The illumination system of claim 1 wherein the at least one terminal luminaire processor:
receives, via the terminal luminaire transceiver, sensor data from at least one sensor; and
sends, via the terminal luminaire transceiver, the received sensor data to the gateway luminaire.

13. The illumination system of claim 12 wherein the at least one terminal luminaire processor:
stores the sensor data temporarily in the nontransitory processor-readable storage medium of the terminal luminaire.

14. The illumination system of claim 12 wherein the at least one sensor comprises at least one of a motion sensor, a temperature sensor, a humidity sensor, a carbon monoxide sensor, a noise sensor, or a gunshot detection sensor.

15. The illumination system of claim 14, further comprising:
a data storage device, comprising:
at least one data storage device processor;
a data storage device transceiver operatively coupled to the at least one data storage device processor; and
at least one data storage device nontransitory processor-readable storage medium operatively coupled to the at least one data storage device processor and storing at least one of data or instructions which, when executed by the at least one data storage device processor, cause the at least one data storage device processor to:
receive, via the data storage device transceiver, sensor; and
store the received sensor data in the at least one data storage device nontransitory processor-readable storage medium.

16. The illumination system of claim 1 wherein the at least one gateway luminaire processor:
receives, via the first gateway luminaire transceiver, sensor data from at least one of the terminal luminaires; and
sends, via the second gateway luminaire transceiver, the received sensor data to the at least one mobile system.

17. The illumination system of claim 16 wherein the at least one sensor comprises at least one of a motion sensor, a temperature sensor, a humidity sensor, a carbon monoxide sensor, a noise sensor, or a gunshot detection sensor.

18. A method of operating an illumination system, the illumination system comprising a plurality of terminal luminaires each comprising a terminal luminaire transceiver which communicates via a first communications protocol and a gateway luminaire comprising first and second gateway transceivers which communicate via first and second communications protocols, respectively, the method comprising:

receiving, via the second gateway luminaire transceiver, at least one of instructions or data from at least one mobile system via the second communications protocol; and
sending, via the first gateway luminaire transceiver, the received at least one of instructions or data to at least one of the plurality of terminal luminaires via the first communications protocol.

19. The method of claim 18 wherein receiving at least one of instructions or data from at least one mobile system comprises receiving at least one of commissioning data, decommissioning data, dimming level data, light schedule data, firmware update data or operational parameter data from the at least one mobile system.

20. The method of claim 18, further comprising:
receiving, via the first gateway luminaire transceiver, luminaire information from at least one of the terminal luminaires, the luminaire information comprising at least one of identifier information, operational information, or maintenance information for at least one of the terminal luminaires; and
sending, via the second gateway luminaire transceiver, the received luminaire information to the at least one mobile system.

21. The method of claim 18, further comprising:
receiving, via the first gateway luminaire transceiver, at least one of instructions or data from at least one of the plurality of terminal luminaires; and
sending, via the second gateway luminaire transceiver, the received at least one of instructions or data to the at least one mobile system.

22. The method of claim 18, further comprising:
sending, via a first mobile system transceiver of a mobile system, at least one of instructions or data to the gateway luminaire via the second communications protocol; or
receiving, via the first mobile system transceiver of the mobile system, at least one of instructions or data from the gateway luminaire via the second communications protocol.

23. The method of claim 22, further comprising:
sending, via a second mobile system transceiver of the mobile system, at least one of instructions or data to at least one remote processor-based device; or
receiving, via the second mobile system transceiver of the mobile system, at least one of instructions or data from the gateway luminaire.

24. The method of claim 23 wherein sending or receiving via the second mobile system transceiver comprises sending or receiving at least one of instructions or data via the first communications protocol.

25. The method of claim 23 wherein sending or receiving via the second mobile system transceiver comprises sending or receiving at least one of instructions or data via a third communications protocol, the third communications protocol different from the first and second communications protocols.

26. The method of claim 25 wherein sending or receiving via the second mobile system comprises sending or receiving at least one of instructions or data via the third communications protocol, the third communications protocol comprises a mobile telecommunications protocol.

27. The method of claim 23, further comprising:
receiving, via a data storage device transceiver communicatively coupled to a data storage device, sensor data; and storing the received sensor data in at least one data storage device nontransitory processor-readable storage medium of the data storage device.

28. The method of claim 18, further comprising:
receiving, via a terminal luminaire transceiver of one of the plurality of terminal luminaires, sensor data from at least one sensor; and
sending, via the terminal luminaire transceiver, the received sensor data to the gateway luminaire.

29. The method of claim 28 wherein receiving sensor data from the at least one sensor comprises receiving sensor data from at least one sensor which comprises at least one of: a motion sensor, a temperature sensor, a humidity sensor, a carbon monoxide sensor, a noise sensor, or a gunshot detection sensor.

30. The method of claim 18, further comprising:
receiving, via first gateway luminaire transceiver, sensor data from at least one of the terminal luminaires; and
sending, via the second gateway luminaire transceiver, the received sensor data to the at least one mobile system.

31. The method of claim 30 wherein receiving sensor data comprises receiving sensor data which originates from at least one of: a motion sensor, a temperature sensor, a humidity sensor, a carbon monoxide sensor, a noise sensor, or a gunshot detection sensor.

32. An illumination system, comprising:
a plurality of terminal luminaires, each of the terminal luminaires comprising:
at least one terminal luminaire processor;
at least one light source operatively coupled to the at least one terminal luminaire processor;
a terminal luminaire transceiver operatively coupled to the at least one terminal luminaire processor, in operation the terminal luminaire transceiver communicates via a first communications protocol; and
at least one nontransitory processor-readable storage medium operatively coupled to the at least one terminal luminaire processor and storing at least one of data or instructions;
a gateway luminaire comprising:
at least one gateway luminaire processor;
at least one light source operatively coupled to the at least one gateway luminaire processor;
a first gateway luminaire transceiver operatively coupled to the at least one gateway luminaire processor, in operation the first gateway luminaire transceiver communicates via the first communications protocol;
a second gateway luminaire transceiver operatively coupled to the at least one gateway luminaire processor, in operation the second gateway luminaire transceiver communicates via a second communications protocol, the second communications protocol different from the first communications protocol; and
at least one nontransitory processor-readable storage medium operatively coupled to the at least one gateway luminaire processor and storing at least one of data or instructions which, when executed by the at least one gateway luminaire processor, cause the at least one gateway luminaire processor to:
receive, via the first gateway luminaire transceiver, at least one of instructions or data from at least one of the plurality of terminal luminaires; and
send, via the second gateway luminaire transceiver, the received at least one of instructions or data to at least one mobile system.

* * * * *